United States Patent [19]
Carobolante

[11] Patent Number: 5,869,946
[45] Date of Patent: Feb. 9, 1999

[54] PWM CONTROL OF MOTOR DRIVER

[75] Inventor: Francesco Carobolante, Scotts Valley, Calif.

[73] Assignee: STMicroelectronics, Inc., Carrollton, Tex.

[21] Appl. No.: 814,932

[22] Filed: Feb. 27, 1997

[51] Int. Cl.[6] ..................................................... H02P 5/17
[52] U.S. Cl. ......................... 318/811; 318/811; 318/354; 363/41
[58] Field of Search ............................. 318/254, 41, 597, 318/811; 363/41

[56] References Cited

U.S. PATENT DOCUMENTS

| | | | |
|---|---|---|---|
| 4,352,152 | 9/1982 | Smith | 318/811 |
| 4,633,150 | 12/1986 | Inaji et al. | 318/254 |
| 4,651,067 | 3/1987 | Ito et al. | 318/254 |
| 5,191,269 | 3/1993 | Carobolante | 318/254 |
| 5,633,788 | 5/1997 | Tanaka et al. | 363/41 |

*Primary Examiner*—William M. Shoop, Jr.
*Assistant Examiner*—Rita Leykin
*Attorney, Agent, or Firm*—Steve D. Beyer; Theodore E. Galanthay; Lisa K. Jorgenson

[57] ABSTRACT

Methods and apparatuses are provided for use in driving a multiple-phase brushless motor. The methods and apparatuses include generating a slewed phase control signal for each phase of the motor. The slewed phase control signals are substantially proportional to a speed control signal during non-transitioning periods, and are slewed from one state to the next state over time during transitioning periods. The transitioning periods being associated with a commutation point. The slewed phase control signals are used to generate pulse width modulated (PWM) driving signals, for each phase of the motor. Thus, the shape of the resulting PWM driving signal will include additional PWM pulses during the transitioning period that provide for a trapezoidal shaping of the current supplied to each of the phase coils in the motor. The result is that torque ripple is reduced because the overall current applied to the motor and the torque resulting therefrom will tend to be more constant during commutation.

23 Claims, 6 Drawing Sheets

PWM CONTROL OF MOTOR DRIVER

BACKGROUND

The present invention relates generally to the control of electrical motors, and more specifically to methods and apparatuses for more effectively controlling the torque in a multiple phase brushless sensorless motor with a pulse width modulated (PWM) driving signal.

Electric motors may be used in a variety of devices, including disc drives and video cassette recorders (VCRs). Applications, such as these, tend to include a multiple phase brushless sensorless spindle motor that is controlled with a motor controller circuit. A motor controller circuit typically supplies a drive signal directly to the phase coils within the motor to operate the motor.

FIG. 1 illustrates a conventional disc drive 10 having a housing 12 that contains most of the disc drive components. A plurality of information storage discs 14 are journaled about a spindle motor assembly 16, having a spindle motor 18. A rotary actuator 20 carries a plurality of head arms 22, each having at least one associated read/write head 24 adapted for transferring information between the information storage discs 14 and an external computer system. A voice coil motor 26 provides precise rotary movement to rotary actuator 20 to accurately position heads 24. Thus, the combined motions of rotary actuator 20 and spindle motor assembly 16 allow the heads 24 to randomly access any segment of the discs 14. Control of voice coil motor 26 is accomplished through a voice coil motor controller 28. Control of spindle motor assembly 16 is accomplished through a motor controller 30. A disc I/O controller 32 is provided for transferring information to an external computer system through data port 34.

FIG. 2 further illustrates the connections between motor controller 30 and motor 18. As shown, motor controller 30 outputs a drive signal onto a drive signal line 36, for each phase, which cause motor 18 to operate. While operating, motor 18 outputs a back-EMF signal to motor controller 30 through a feedback line 38.

As known in the art, the drive signals applied to the coils of the motor may take on different waveforms, depending upon the system and the desired operation. Two common types of driving signals are linear and digital driving signals. Linear driving signals tend to have waveforms that are fairly continuous in nature, such as a direct current (DC) signal. Digital driving signals tend to have waveforms that are switched on and off over time, such as a digital pulse train. Pulse width modulation (PWM) is one example of a scheme to drive an electric motor using a digital pulse train. For instance, commonly assigned U.S. Pat. No. 4,972,130 issued Nov. 20, 1990 discloses a particular system that uses PWM driving circuits for driving the coils of a motor.

A typical objective in either a linear or a digital motor control system is to establish and maintain the operation of the motor as required for the application. For example, in a disc drive 10 the rotational speed of motor 18 may be held substantially constant, for a given load, by applying drive signals that supply a constant current to the coils so as to maintain a substantially constant torque.

In order to cause the desired torque in the motor, brushless motors typically require a motor controller capable of selectively connecting and disconnecting (i.e., commutating), each of the motor's coils to and from the driving signals at particular times. Calculating the proper commutation time usually requires determining, or monitoring, the location of the motor's rotor with regard to the coils. This may be accomplished, for example, by including sensors that relate such information to the motor controller circuit, or by evaluating a back-EMF signal generated in one or more of the coils within the motor. For sensorless motors, the back-EMF signal may be fed-back to the motor controller to determine the commutation time along with the difference (i.e., error) between the actual and desired rotational speeds. Such techniques are known to those skilled in the art, and include for instance, the methods and apparatuses disclosed in commonly assigned U.S. Pat. No. 5,317,243 issued May 31, 1994, U.S. Pat. No. 5,306,988 issued Apr. 26, 1994, U.S. Pat. No. 5,223,772 issued Jun. 29, 1993, and U.S. Pat. No. 5,221,881 issued Jun. 22, 1993, each of which are incorporated herein by reference.

FIG. 3 illustrates the basic shape of a back-EMF signal 40 generated by a three phase motor. As shown, back-EMF signal 40 is essentially a combination of three BEMF phase signals 42a, 42b and 42c that are superimposed over one another. BEMF phase signals 42a–c are sinusoidal in shape and 120° out of phase as plotted with respect to angle α. BEMF phase signal 42b is shown as being zero volts at an angle $\alpha_1$, 44, and BEMF phase signal 42c is shown as being zero volts at angle $\alpha_2$ 46. As shown, BEMF phase signals 42a and 42b are shown as crossing one another at angle $\alpha_3$ 48, BEMF phase signals 42a and 42c are shown as crossing one another at angle $\alpha_4$ 50, and BEMF phase signals 42b and 42c are shown as crossing one another at angle $\alpha_5$ 52. Typically, angles 48, 50 and 52 are referred to as commutation points.

Also shown in FIG. 3, there is a phase B vector 54 extending in the positive direction from zero volts to BEMF phase signal 42b, and a phase C vector 56 extending in the negative direction from zero volts to BEMF phase signal 42c. Vectors 54 and 56 represent the magnitude of the back-EMF for a given angle α. As known in the art, the torque created for each phase will be equal to the current flowing through the phase coil multiplied by the torque constant $K_T$ for the phase at that angle. The total effective torque applied to the motor will therefore equal the sum of the vectors, as shown below:

$$T = (|K_{T_{B(\alpha)}}| + |K_{T_{C(\alpha)}}|)I_x$$

Typically, to drive the motor in a given direction, the motor is driven with a current in the direction that provides for a positive total torque. It is known in the art that to achieve maximum efficiency the commutation should be performed when the BEMF on the two phases is equal.

Unfortunately, a torque ripple may be introduced into the motor during commutation. Torque ripple can produce jitter in the motor and possibly an accompanying, acoustical noise. Torque ripple can typically be found in both linear and PWM systems because of the torque fluctuations occurring during commutation of phases due to the abrupt decay of the current in one coil and the relatively slower rise of the same in the next energized coil. The effects of torque ripple, such as introducing jitter in the system, are well known to those skilled in the art. For instance, commonly assigned U.S. Pat. No. 5,191,269 issued Mar. 2, 1993, addresses such problems in a linear system by disclosing circuitry that minimizes torque ripple in a linearly driven motor.

It is therefore the goal of many systems to maximize the torque, while minimizing the torque ripple. In theory, it is possible to design an optimal sinusoidal (linear) or pseudo-sinusoidal (digital) driving circuit wherein each of the BEMF phase signals is in phase with its respective driving signal's current. In such a system the power flow (energy)

would theoretically be a constant, in accord with the following equation:

$$\sin^2(\omega t)+\sin^2(\omega t+120°)+\sin^2(\omega t+240°)=1$$

Thus, in principle such a system would yield zero torque ripple.

In practice, however, it is often very difficult to design such a digital system and also very expensive in terms of the quantity and quality of circuit components. For example, the motor controller circuitry would be required to maintain three different waveforms in synchronization which may require three separate supplies along with PLLs, or some form of digital circuitry with look-up tables, etc. Such a circuit, when embodied in an integrated circuit package may, for example, require anywhere from 3000 to 5000 logic gates.

In view of the foregoing, what is desired are cost effective methods and apparatuses for driving an electric motor with a PWM waveform wherein the total torque applied to the motor may be better controlled and torque ripple further reduced.

SUMMARY

The present invention includes methods and apparatuses for commutating a motor driver while in pulse width modulated (PWM) mode of operation. The present invention provides cost effective methods and apparatuses for driving an electric motor with a PWM waveform wherein the total torque applied to the motor may be better controlled and torque ripple further reduced by gradually slewing the PWM driving signals during commutation.

In accordance with one embodiment of the present invention, there is provided a method for driving a multiple-phase motor. The method includes generating a slewed phase control signal that represents at least two operating states. One of the operating states is basically an ON state wherein the slewed phase control signal is directly proportional to the desired speed of the motor as represented by a speed control signal. The second state may, for example, be a FLOATING or OFF state. The method includes gradually slewing the phase control signal between the operating states during a transition period that is associated with a commutation event. The method further includes generating a PWM phase driving signal that is proportional to the slewed phase control signal and supplying the PWM phase driving signal to the motor. In accordance with one aspect of the present invention, the transitioning period may begin prior to the commutation event and end after the commutation event. For example, the transitioning period may begin about 30° (electrical) prior to the commutation event and end about 30° (electrical) after the commutation event.

In accordance with another embodiment of the present invention, there is provided an apparatus for driving a multiple-phase motor. The apparatus includes a slewing transitioner that generates a PWM phase driving signal that represents at least two operating states. The slewing transitioner gradually switches between the operating states during a transitioning period, and supplies the PWM phase driving signal to the motor.

In accordance with yet another embodiment of the present invention, there is provided an improved driver circuit for use in a motor controller that has a control circuit. The control circuit outputting a speed control signal and one or more commutation control signals. The improved driver circuit includes a buffer stage, a current switcher stage, a comparator stage, and a driving stage. Each stage may, for example, include dedicated circuits for each phase of the motor. The buffer stage is coupled to the control circuit and arranged to generate at least one phase control signal that is proportional to the received speed control signal. The current switcher stage is coupled to the buffer stage and to the control circuit, and arranged to generate a slewed phase control signal that is a function of the received phase control signal and the received commutation control signal. The comparator stage is coupled to the current switcher stage and arranged to generate a PWM phase control signal that is proportional to the slewed phase control signal. The driving stage is coupled to the comparator stage, and arranged to generate a driving signal that is proportional to the PWM phase control signal and suitable for driving a motor. The slewed phase control signal may, for example, represent at least two operating states wherein a first one of the operating states is directly proportional to a speed control signal and is slewed between the operating states during a transitioning period.

One implementation of the current switcher stage includes a first and a second current source, each of which are coupled to the control circuit and arranged to generate a first and a second current signal, respectively, wherein the second current is opposite in polarity to the first current. The first and second current signals are applied to a compensation node that includes a slewing capacitor that is coupled between the compensation node and ground. The current switcher stage may also include one or more clamping diodes that are coupled between the buffer stage and the compensation node and arranged to control the voltage applied to the compensation node.

One implementation of the comparator stage includes a triangular waveform generator and a comparator. The comparator is coupled to the triangular waveform generator for receiving a triangular waveform signal and to the current switcher stage for receiving the slewed phase control signal. The comparator is further arranged to generate a PWM phase control signal that is a function of the triangular waveform signal and the slewed phase control signal.

One implementation of the buffer stage includes a decoupling device, such as a PNP transistor, that is coupled to the control circuit for receiving the speed control signal to a compensation node in the current switcher stage for providing the phase control signal thereon. The decoupling device essentially provides a high impedance on the compensation node. Such a buffer stage may be used in a driver circuit that generates a constant frequency PWM driving signal.

Another implementation of the buffer stage includes a first buffer and a second buffer. The first buffer is coupled to the control circuit for receiving the speed control signal and arranged to generate a first phase control signal that is proportional to the speed control signal. The second buffer is coupled the output of the first buffer and arranged to generate a second phase control signal that is opposite in polarity to the first phase control signal with respect to a reference voltage signal. The second buffer may, for example, be an inverting buffer having a first input coupled to the reference voltage signal and a second input coupled to receive the first phase control signal from the first buffer. . Such a buffer stage may be used in a driver circuit that generates a phase-shifted frequency PWM driving signal.

In yet another embodiment of the present invention, there is provided a motor controller for use with a motor. The motor controller includes a control circuit that is arranged to generate a speed control signal and a commutation control signal, and an improved driver circuit as described above. In still another embodiment of the present invention, a motor controller having an improved driver circuit is included in a disc drive along with a motor.

BRIEF DESCRIPTION OF THE DRAWINGS

The invention, together with further objects and advantages thereof, may best be understood by reference to the following description taken in conjunction with the accompanying drawings in which:

FIG. 7b is a timeline graph that illustrates representative signals of the inputs to the comparator stage of the improved driver circuit illustrated in FIG. 7a;

FIG. 7c is a timeline graph that illustrates representative output voltage and current signals associated with the two PWM phase driving signals produced by the improved driver circuit illustrated in FIG. 7a;

FIG. 8b is a timeline graph that illustrates representative signals of the inputs to the comparator stage of the improved driver circuit illustrated in FIG. 8a;

FIG. 8c is a timeline graph that illustrates representative output voltage and current signals associated with the two PWM phase driving signals produced by the improved driver circuit illustrated in FIG. 8a;

DESCRIPTION

Figure 4:
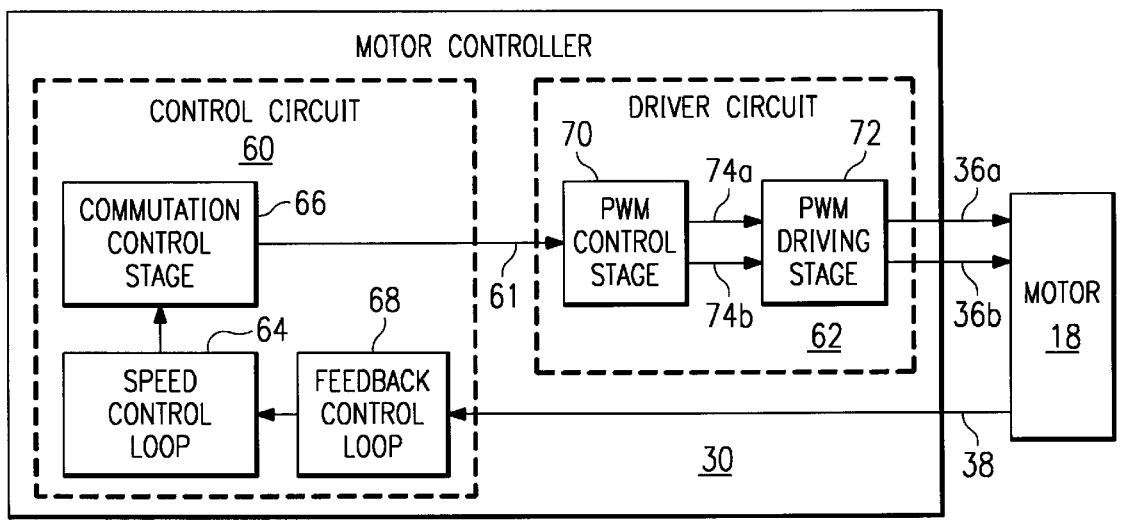
FIG. 4 is a block diagram that illustrates a prior-art motor controller, as in FIG. 2, having a control circuit and a driver circuit.

To better understand the advantages of the present invention, the operation of a conventional motor controller will first be discussed so as to point-out how such a controller may actually introduce unwanted torque ripple into a system. FIG. 4 illustrates a block diagram of a conventional motor controller 30 that produces a constant frequency PWM signal to drive one or more phase coils in motor 18. Motor controller 30 is shown as having a control circuit 60 that outputs control signals over control line(s) 61 to a driver circuit 62. Driver circuit 62 outputs PWM phase driving signals over drive signal lines 36a and 36b.

Control circuit 60 typically coordinates the commutation between phase states, and may include analog and digital circuitry that steps through the states for each of the phase coils in motor 18. Thus, control circuit 60 essentially determines which of the phases within motor 18 are to be driven "high" or "low", or left "floating", depending upon the selected mode of operation. As shown, control circuit 60 includes a speed control loop 64, a commutation control stage 66 and a feedback control loop 68. Speed control loop 64 establishes the desired speed of motor 18 and determines the difference between the desired speed and the actual, or calculated speed based upon a feedback signal received from feedback control loop 68. The output of speed control loop 64 is typically a speed control voltage or current signal that is proportional to the correction required to operate motor 18 at the desired speed. The speed control signal is supplied to commutation control stage 66 which may modify the speed control signal, and/or pass it on through to driver circuit 62. Commutation control stage 66 selectively controls the state of each phase. The outputs of commutation control stage 66 typically includes a commutation control signal for each phase. Commutation control stage 66 may also supply the speed control signals from speed control loop 64 over lines 61 along with the commutation control signals.

As shown, driver circuit 62 includes a PWM control stage 70 and a PWM driving stage 72. PWM control stage 70 receives commutation control signals and speed control signals from control circuit 60. PWM control stage 70 typically includes dedicated circuits for each phase that may be activated or deactivated by one or more commutation control signals. When activated, these dedicated circuits generate PWM phase control signals that are proportional to the speed control signal. The PWM phase control signals are supplied to PWM driving stage 72 through phase control lines 74a and 74b. While only two phase control lines 74a–b are shown, it is recognized that there may be more, e.g., one for each phase. PWM control stage 70 may include one or more comparators for comparing the speed control signal to a triangular waveform signal generated therein. Such PWM signal generation techniques and associated circuitry are well known to those skilled in the art.

PWM driving stage 72 generates a PWM phase driving signal that is proportional to the PWM phase control signal associated with each phase. The PWM phase driving signals may then be supplied to the respective phase coils in motor 18. PWM driving stage 72 may, for example, include a push-pull driver circuit that connects and disconnects the phase coils to a driving current, a floating node and/or ground, in accordance with the PWM phase control signals.

Techniques and circuitry, such as those described above with respect to control circuit 60 and driver circuit 62 are well known to those skilled in the art. For example, see U.S. Pat. Nos. 5,317,243, 5,306,988, 5,223,772, 5,221,881, and 5,204,594 which are incorporated herein by reference.

Figure 5:
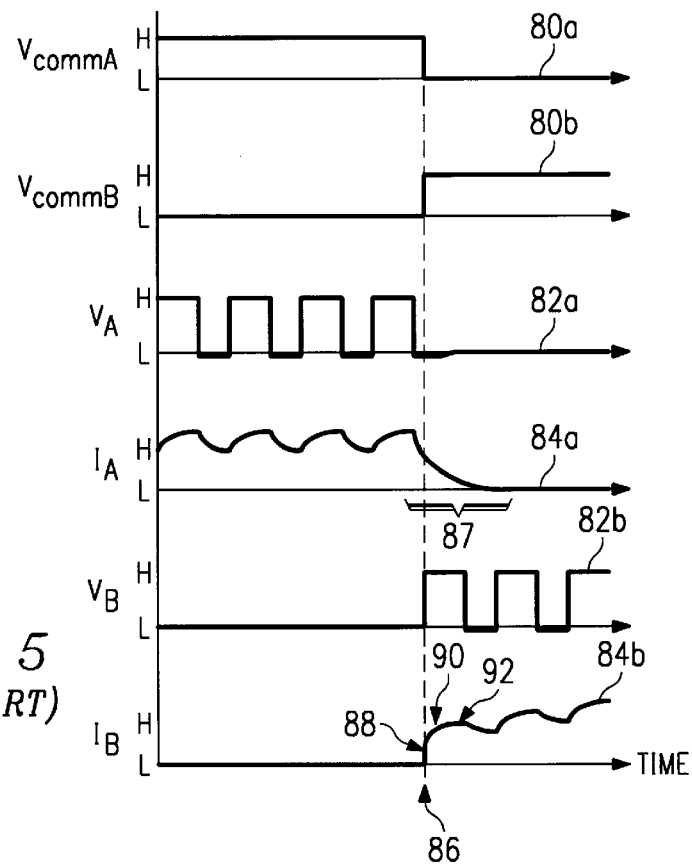
FIG. 5 is a timeline graph that illustrates representative signals produced by the motor controller of FIG. 4.

The operation of control circuit 60 and driver circuit 62 are illustrated in FIG. 5 which depicts various signals associated with two phases, i.e., a phase A and a phase B. The signals shown in FIG. 5 include a phase A commutation control signal 80a and phase B commutation control signal 80b (each being proportional to the speed control signal when ON), PWM phase driving signal 82a and the resulting phase A current 84a, and PWM phase driving signal voltage 82b and the resulting phase B current 84b. As illustrated, there is a commutation occurring at time 86, wherein phases A is turning OFF and phase B is turning ON. By way of example, the phase A coil may be shifted from a high state to a floating state and the phase B coil may be shifted from a floating state to a high state, upon commutation. Following commutation the current 84a decreases over time to about zero, while at the same time, current 84b begins to increase over time.

As shown, voltages 82a–b include recirculating voltages that tend to drive the PWM signals negative between pulses.

These recirculating effects are reduced following commutation, as reflected by voltage 82*a* which eventually returns to about zero volts. Likewise, current 84*a* decreases and eventually reaches about zero during period 87. Following commutation, voltage 82*b* is in the shape of the PWM driving signal pulse train, and related current 84*b* includes a jump 88 at time 86 (believed to be a result of parasitic coupling within motor 18), followed by an increased ramp during period 90 (due to recirculating voltage effects) and a normal ramp in period 92 and thereafter (due to the inductance and resistances in motor 18). At some time, generally later than period 87, current 84*b* completes its "ramping-up" to a running current similar in shape to current 84*a* prior to commutation.

Nonetheless, despite the shape of current 84*b* following commutation, there is still a fluctuation in the total current being applied to motor 18 because current 84*a* tends to decrease faster than current 84*b* increases. This fluctuation can lead to increased torque ripple.

Figure 6:
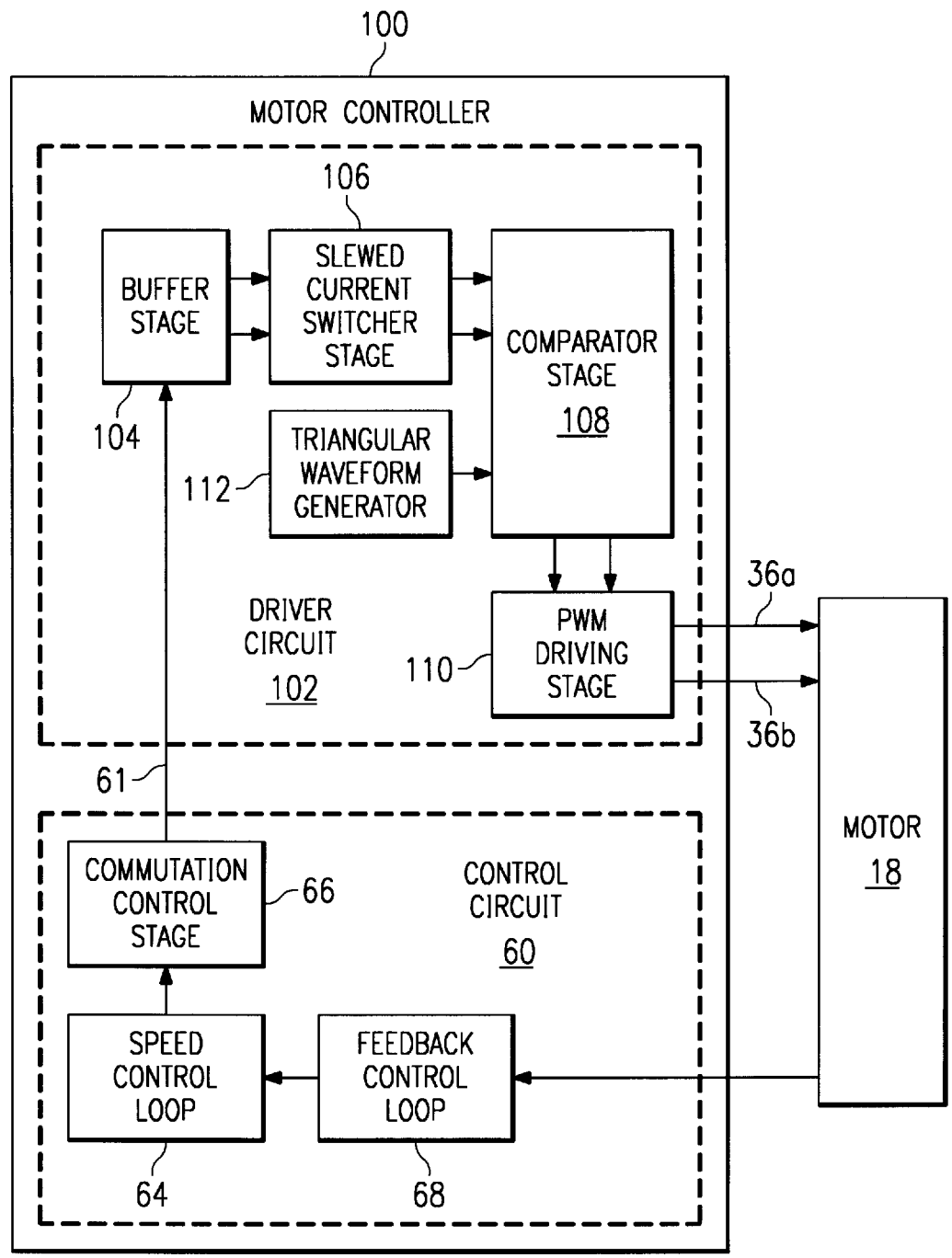
FIG. 6 is a block diagram that illustrates a motor controller having an improved driver circuit suitable for use in driving a motor, in accordance with one embodiment of the present invention, the improved driver circuit includes a buffer stage, a slewed current switcher stage, a comparator stage, and a PWM driving stage.

Thus, in accordance with an embodiment of the present invention, FIG. 6 illustrates a block diagram of an improved motor controller 100 that reduces such fluctuations and associated torque ripple. Motor controller 100 includes a control circuit 60 (as in FIG. 4), and an improved driver circuit 102. As shown, driver circuit 102 includes a buffer stage 104, a slewed current switcher stage 106, a comparator stage 108, a PWM driving stage 110, and a triangular waveform generator 112. As will be shown below, improved driver circuit 102 produces slewed PWM phase driving signals that include one or more additional PWM pulses, of varying width, during a transitioning period that may include the commutation point. These additional pulses tend to fill in for the fluctuations that may occur in the total current during commutation from one phase to the next.

As shown, buffer stage 104 receives control inputs from control circuit 60 over control signal line 61 and replicates, or otherwise supplies, the control signals thereon for use in each of the phases. Buffer stage 104 may, for example, include one or more buffering transistors or buffering amplifiers for each phase. The outputs of buffer stage 104 are phase control signals which are, for the ON phase, proportional to the speed control signal. Additionally, buffer stage 104 may pass certain control signals without modification, such as, for example, phase commutation signals onto the next stage.

The phase control signals are provided to slewed current switcher stage 106 which uses these signals to generate slewed phase control signals, each of which is proportional to the corresponding phase control signal leading up to, and following, a transitioning period. During the transitioning period, the slewed phase control signals may be slewed from one state to the next state (for a given phase), over time. By way of example, assume that a given phase is being driven high, i.e., the phase is ON. As such, prior to the start of the transitioning period the slewed phase control signal will be substantially proportional to the phase control signal. However, upon reaching a transitioning period the slewed phase control signal will be slewed from a high to a low or floating state (e.g., OFF state) during the duration of the transitioning period. Thus, for example, if the high state is represented by a positive voltage and the low state is represented by a zero voltage state, during the transitioning period the slewed phase control signal will be decreased over time from the positive voltage to zero voltage. Conversely, for the phase being switched ON, its slewed phase control signal may be increased over time, during a transitioning period, from zero voltage to the high voltage.

As such, rather than having an abrupt change from one state to the next upon a commutation event, the change is spread out over time by gradually slewing (up or down) between states during the transistioning period. The resulting slewed phase control signals are then supplied to comparator stage 108.

Comparator stage 108 compares the slewed phase control signals with a triangular waveform signal provided by triangular waveform generator 112, and outputs a proportional PWM phase control signal for each phase. Comparator stage 108 may, for example, include a comparator for each phase that outputs a PWM digital pulse train having a duty cycle proportional to the phase control signal for that phase and having a frequency proportional to the frequency of the triangular waveform signal. As is known in the art, the frequency of the triangular waveform may be selected to be substantially higher than the associated commutation frequency for a given phase. For example, it is common for the triangular wave form to have a frequency of between about 20–30 Khz. The outputs of comparator stage 108 are supplied to PWM driving stage 110.

Figure 7A:
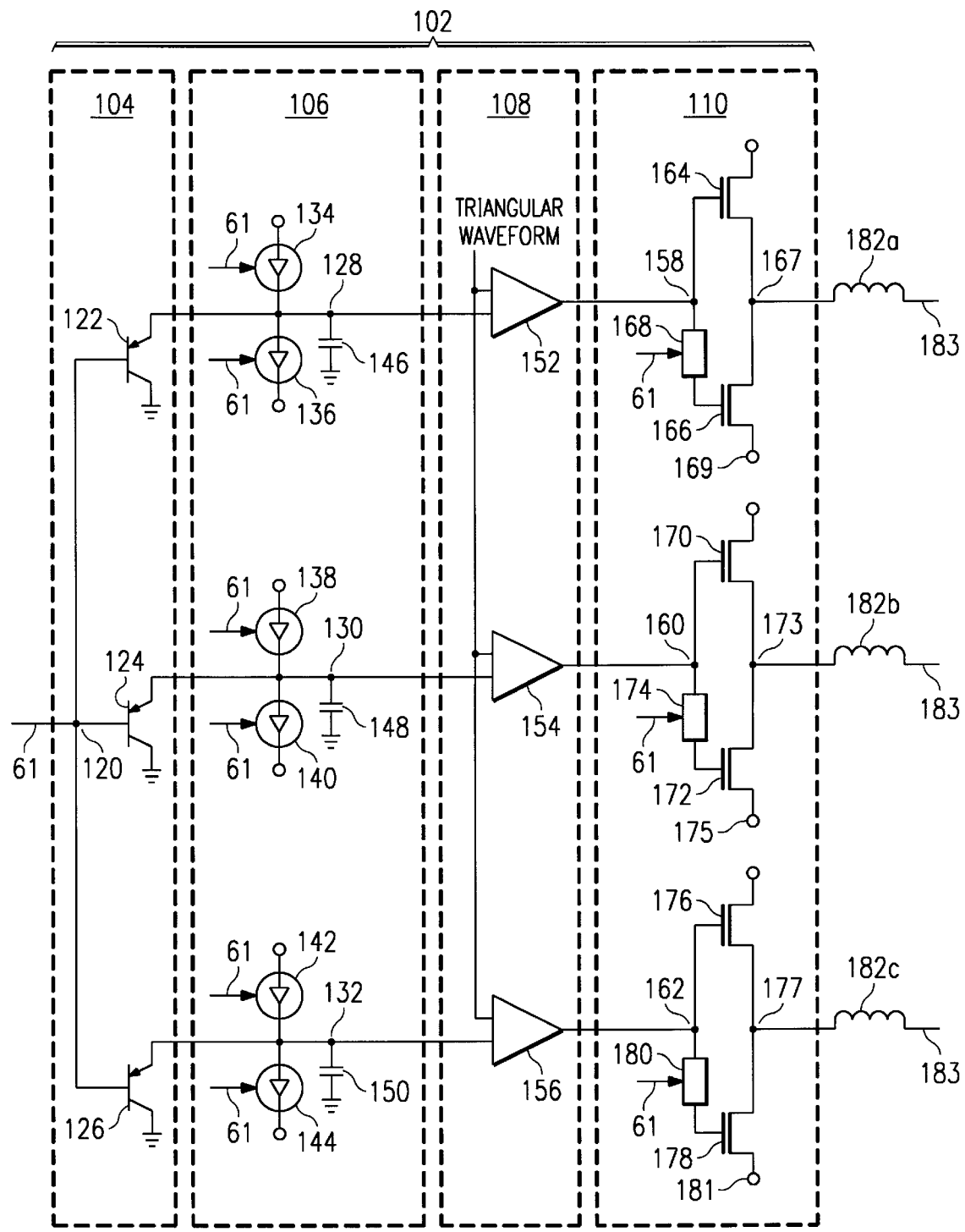
FIG. 7a is a circuit diagram that illustrates a first implementation of the improved driver circuit illustrated in FIG. 6.

FIG. 7*a* illustrates a first implementation of driver circuit 102 as shown in FIG. 6, in accordance with one embodiment of the present invention. Driver circuit 102 includes buffer stage 104, slewed current switcher stage 106, comparator stage 108, and driver stage 110.

As shown, buffer stage 104 receives the speed control signal from control line 61 at input node 120. Buffer stage 104 includes a PNP transistor for each phase. For phase A, PNP transistor 122 is provided, having its base coupled to node 120, its emitter coupled to phase A slewing node 128 and its collector coupled to ground. For phase B, PNP transistor 124 is provided, having its base coupled to node 120, its emitter coupled to phase B slewing node 130 and its collector coupled to ground. For phase C, PNP transistor 126 is provided, having its base coupled to node 120, its emitter coupled to phase C slewing node 132 and its collector coupled to ground. PNP transistors 122, 124 and 126 may be other similar types of bipolar devices that are capable of providing a buffer that avoids loading on compensation node 61, respectively, by acting as decoupling devices (for example, by providing a high impedance on the compensation node). Notice, that when an emitter of PNP transistors 122, 124 and 126 (which is driven by the associated current sources, discussed below) is pulled low the transistor basically turns-off, and therefore does not interfere with the downstream slewing of the phase control signal, during transitioning periods, by slewed current switcher stage 106.

Slewed current switcher stage 106 includes two opposing current sources for each phase wherein the current sources are controlled (ON/OFF) by the commutation controlling signal associated with that phase (via control signal lines 61). For phase A, current sources 134 and 136 are provided and coupled to phase A slewing node 128. For phase B, current sources 138 and 140 are provided and coupled to a phase B slewing node 130. For phase C, current sources 142 and 144 are provided and coupled to a phase C slewing node 132.

Slewed current switcher stage 106 also includes a slewing capacitor for each phase. For phase A, a slewing capacitor 146 is provided and coupled between phase A slewing node 128 and ground. For phase B, slewing capacitor 148 is provided and coupled between phase B slewing node 130 and ground. For phase C, slewing capacitor 150 is provided and coupled between phase C slewing node 132 and ground. For each phase, the associated slewing capacitor may be charged and discharged, during transitioning periods, based on the magnitude of the phase control signal on the phases compensation node. The rate of the change, or slope, of the charge and discharge need not be the same and is proportional (and therefore selectable) to the slewing capacitor's capacitance and the associated current sources, for each phase. The outputs of slewed current switcher stage 106 are supplied to comparator stage 108.

Comparator stage 108 includes a comparator for each phase. For phase A, a comparator 152 is provided having a first input coupled to phase A slewing node 128 and a second input coupled to receive a triangular waveform signal from triangular waveform generator 112 as shown in FIG. 6. For phase B, a comparator 154 is provided having a first input coupled to phase B slewing node 130 and a second input coupled to receive the triangular waveform signal. For phase C, a comparator 156 is provided having a first input coupled to phase C slewing node 132 and a second input coupled to receive the triangular waveform signal. The outputs from comparators 152, 154 and 156 are applied to nodes 158, 160 and 162, respectively.

Comparators 152, 154 and 156 compare the voltage present on nodes 128, 130 and 132, respectively, to the triangular waveform signal so as to generate PWM phase control signals having a duty cycle proportional thereto. Notice, that the slewed phase control signals are essentially proportional to the demand for current for a given phase and may be limited to voltages between the minimum and maximum voltages of the triangular waveform signal. As such, an increase in a phase control signal causes an increase of the duty cycle of the PWM phase control signal, and a decreasing in a phase control signal causes a decrease of the duty cycle of the PWM phase control signal.

Driver stage 110 includes a push-pull driver circuit for each phase. The push-pull driver for phase A includes a high-side power transistor 164, a low-side power transistor 166 and a logic block 168. Logic block 168 receives one or more commutation control signals over commutation control lines 61 and an input from node 158. Logic block 168 selectively controls low-side transistor 166. High-side power transistor 164 has its gate coupled to node 158, its drain coupled to receive a driving power signal (from a power supply, not shown), and its source coupled to node 167. Low-side power transistor 166 has its gate coupled to the output of logic block 168, its drain coupled to node 167, and its source coupled to node 169. The push-pull driver for phase B includes a high-side power transistor 170, a low-side power transistor 172 and a logic block 174. Logic block 168 receives one or more commutation control signals over commutation control lines 61 and an input from node 160. Logic block 174 selectively controls low-side transistor 172. High-side power transistor 170 has its gate coupled to node 160, its drain coupled to receive a driving power signal, and its source coupled to node 173. Low-side power transistor 172 has its gate coupled to the output of logic block 174, its drain coupled to node 173, and its source coupled to node 175. The push-pull driver for phase C includes a high-side power transistor 176, a low-side power transistor 178 and a logic block 180. Logic block 180 receives one or more commutation control signals over commutation control lines 61 and an input from node 162. Different commutation control signals 61 may be input for each of the logic blocks 168, 174, and 180. Logic block 180 selectively controls low-side transistor 178. High-side power transistor 176 has its gate coupled to node 162, its drain coupled to receive a driving power signal, and its source coupled to node 177. Low-side power transistor 178 has its gate coupled to the output of logic block 180, its drain coupled to node 177, and its source coupled to node 181. As is known in the art, nodes 169, 175 and 181 may be used to supply the back-EMF signal from each of the phases to a sensing resister or like circuit within a feedback control loop. The output from each of the push-pull drivers is a PWM phase driving signal. As shown, phase coils 182a, 182b and 182c may, for example, be connected in a "Wye" configuration having a common center node 183.

With driver circuit 102, as shown in FIG. 7a, commutation may be started early (i.e., prior to the BEMF phase signals crossing one another), for example, commutation may begin at the previous zero crossing to produce a trapezoidal waveform that is sinusoidal in nature. As mentioned above, based on the selection of slewing capacitors and current sources in slewed current switcher stage 106, the slope of the waveform may be selected. However, it may be possible (in some circuits) to discharge the slewing capacitor to the point where a negative current is established. Thus, it is important to slew in the right amount of time (e.g., during the transitioning period) so as to not drive past zero. One way to avoid this may be to tri-state the phase once the slewing capacitor has been fully discharged. For example, this may be done logically, wherein synchronous rectification is used only when driving the phase (with the commutation control signal), and when the phase is turned off only the synchronous clamping (through a diode, not shown) is driven. Those skilled in the art will recognize these and other similar protective and/or limiting circuits.

Figure 7B:
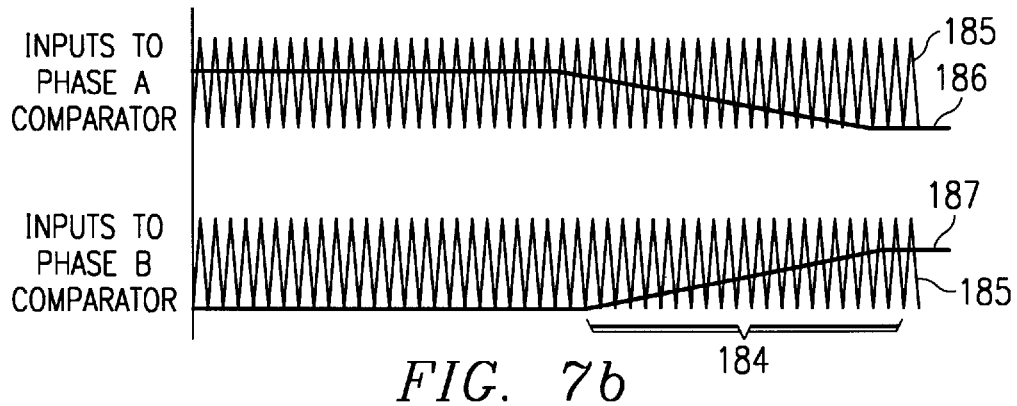

FIG. 7b shows the inputs to comparators 152 and 154 (e.g., phases A and B) to illustrate the effect of slewing the phase control signals during a transitioning period 184. As shown, comparator 152 receives a triangular waveform signal 185 and a slewed phase control signal 186. As slewed phase control signal 186 decreases over time, the duty cycle in the resulting PWM phase control signal will also decrease proportionally. Similarly, comparator 154 receives triangular waveform signal 185 and a slewed phase control signal 187. As slewed phase control signal 187 (for phase B) increases over time, the duty cycle in the resulting PWM phase control signal will also increase proportionally.

Figure 7C:
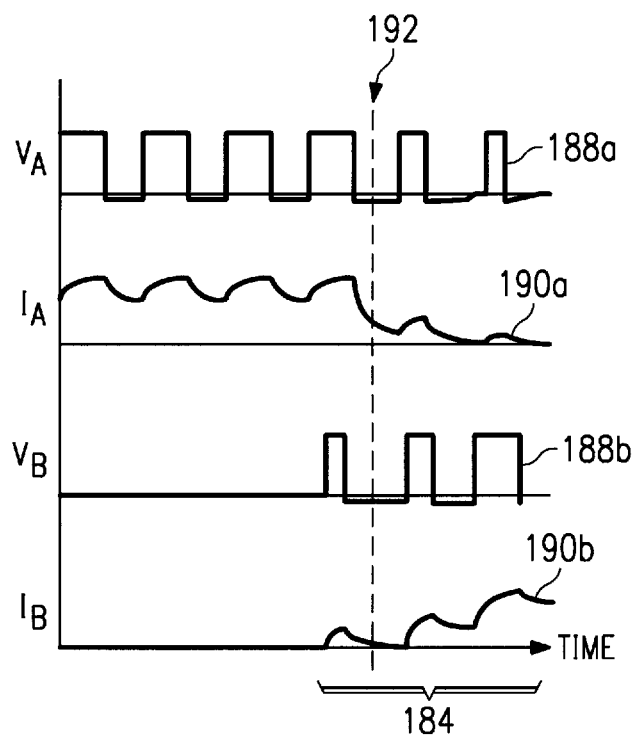

FIG. 7c illustrates the waveforms relating to the operation of driver circuit 102, in FIG. 7a, in accordance with one embodiment of the present invention. The waveforms shown in FIG. 7c represent PWM driving voltages 188a and 188b, for phases A and B respectively, and associated currents 190a and 190b as applied to phase A and B coils 182a and 182b during a transistioning period 184 that begins prior to commutation point 192 and ends shortly thereafter. As depicted, the slewed PWM phase driving signals for the phases essentially provides additional current to the phase coils which tends to "fill-in" the holes left in the total current upon commutation (as discussed above). The resulting current profile for each phase is, thus, trapezoidal in shape and as such may be used to reduce torque ripple.

Driver circuit 102 as depicted in FIG. 7a produces slewed PWM phase driving signal outputs having a constant frequency. There are however, other PWM motor controllers and systems that may benefit from the present invention. Those skilled in the art will recognize that the present invention can readily be adapted for use in such circuits and/or systems. For example, FIG. 8a illustrates another embodiment of buffer stage 104 and slewed current switcher stage 106 as shown in FIG. 6, for use in driver circuit 102 to produce PWM phase driving signals that are phase-shifted.

Figure 8A:
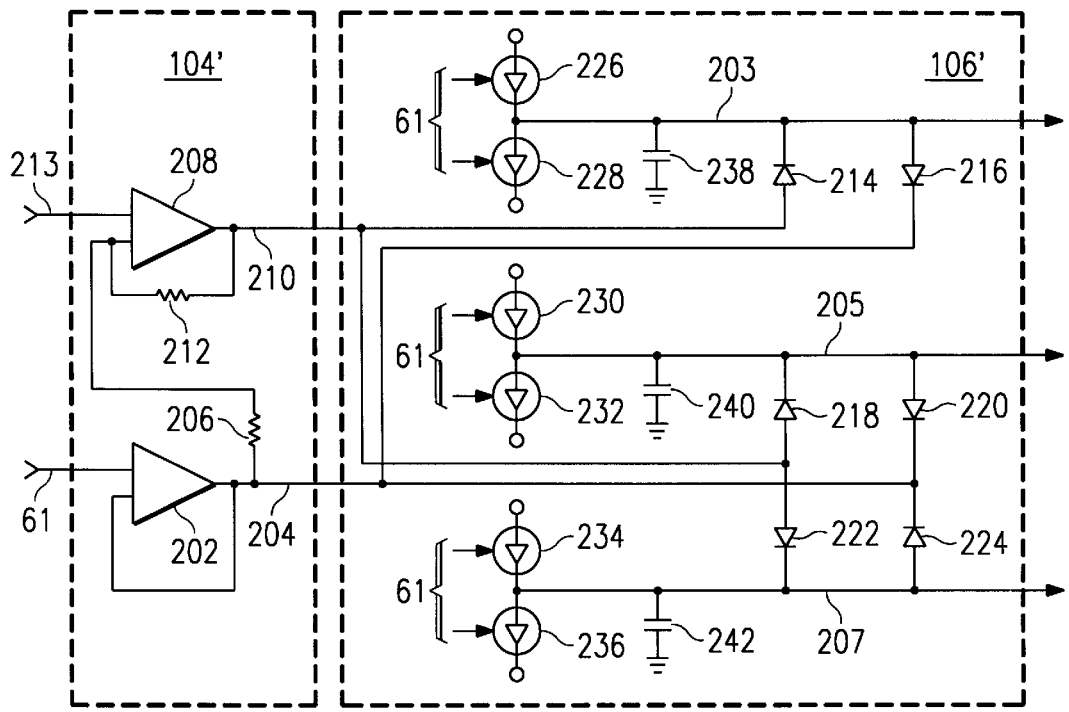
FIG. 8a is a circuit diagram that illustrates a second implementation of the improved driver circuit illustrated in FIG. 6.

Buffer stage 104' in FIG. 8a includes a non-inverting buffer 202 that has one of its inputs coupled to receive one or more speed control signals from control lines 61 and a second input coupled to provide a feedback from its output as applied to node 204. The output of buffer 202 is further applied to nodes 203, 205 and 207, through clamping diodes 216, 220 and 224, respectively. Buffer stage 202 further includes an inverting buffer 208 that has one of its inputs coupled to a resister 206 which is coupled to node 204 and to a feedback resister 212 that is coupled to the output of inverting buffer 208 as applied to node 210. A second input 213 to inverting buffer 208 is coupled to receive an internally generated reference voltage that may be equal to the average (i.e., center value) of the triangular waveform signal generated triangular waveform generator 112 in FIG. 6. The output of inverting buffer 208 is further applied to nodes 203, 205 and 207, through clamping diodes 214, 218 and 222, respectively.

Slewed current switcher stage 106', as shown in FIG. 8a, includes two opposing current sources for each phase wherein the current sources are controlled (ON/OFF) by one or more commutation control signals (from lines 61) associated with each phase. For phase A, current sources 226 and 228 are provided and coupled to a phase A slewing node 203. For phase B, current sources 230 and 232 are provided and coupled to a phase B stewing node 205. For phase C, current sources 234 and 236 are provided and coupled to a phase A slewing node 207. Slewed current switcher stage 106' also includes a slewing capacitor for each phase. For phase A, a slewing capacitor 238 is provided and coupled between phase A slewing node 203 and ground. For phase B, slewing capacitor 240 is provided and coupled between phase B slewing node 205 and ground. For phase C, slewing capacitor 242 is provided and coupled between phase C stewing node 207 and ground. The slewed phase control signals on each of the slewing nodes is then supplied to comparator stage 108.

Figure 8B:
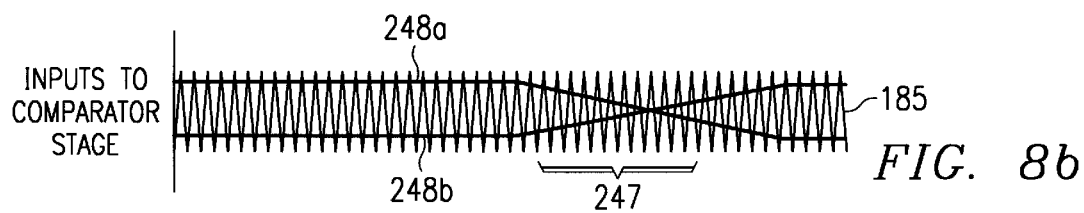

FIG. 8b shows the inputs to comparators 152 and 154 (e.g., phases A and B) to illustrate the effect of slewing the phase control signals during a transitioning period 247. As shown, comparator 152 is provided with a triangular waveform signal 185 and slewed phase control signal 248a from node 203. Similarly, comparator 154 is provided with triangular waveform signal 185 and slewed phase control signal 248b from node 205. However, the slewed phase control signal for phase B is opposite in polarity to the speed control signal as applied to phase A (this aspect is further discussed below). As before, when slewed phase control signal 248a (for phase A) decreases over time, the duty cycle in the resulting PWM phase control signal will decrease proportionally. Likewise, when slewed phase control signal 248b (for phase B) increases over time, the duty cycle in the resulting PWM phase control signal will increase proportionally.

Figure 8C:
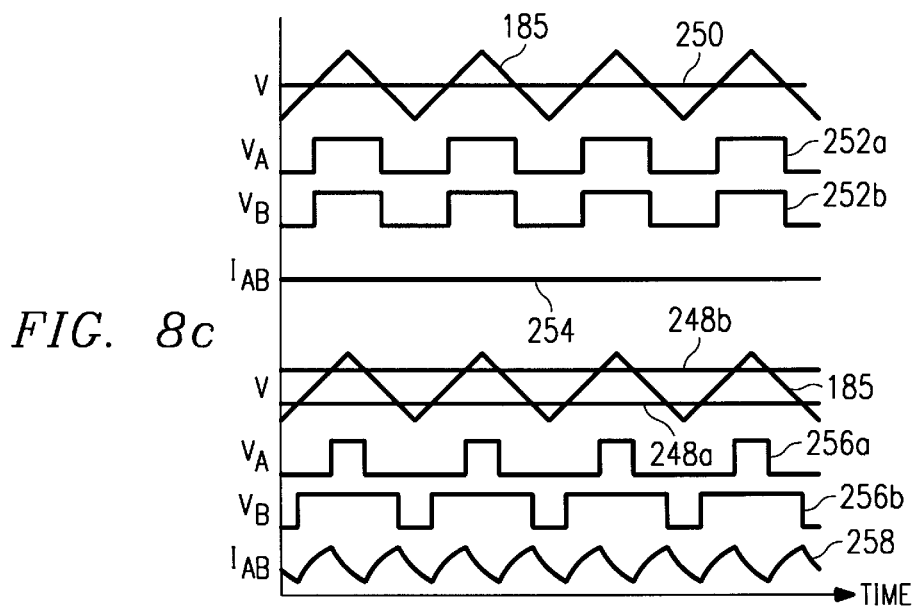

FIG. 8c illustrates the waveforms relating to the operation of driver circuit 102, in FIG. 6 in accordance with the implementation in FIG. 8a. The upper most waveforms illustrate the resulting PWM phase driving signals 252a and 252b, for phases A and B respectively, when the slewed phase control signal for phase A is equal to reference voltage 250 (as applied to node 213 in FIG. 8a). The lower most waveforms illustrate the resulting PWM phase driving signals 252a and 252b, for phases A and B respectively, when the slewed phase control signal for phase A is not equal to reference voltage 250 (as applied to node 213 in FIG. 8a).

In the upper most waveforms, since the slewed phase control signal for phase B is opposite in polarity to the slewed phase control signal for phase A (with respect to the reference voltage), whenever the slewed phase control signal for phase A is equal to the reference voltage, the slewed phase control signal for phase B will also be equal to the reference voltage. As such, control signals A and B may be represented by reference voltage 250. As a result, stewed PWM phase control signals 252a and 252b will have the same duty cycle when signal 250 is compared with triangular waveform signal 185. When slewed PWM phase control signals 252a and 252b are applied to phase A coil 182a and phase B coil 182b, respectively, (but in opposite directions) the resulting current 254 will be about zero because signals 252a and 252b essentially cancel one another. Thus, when the duty cycles of slewed PWM phase driving signals 252a and 252b are equal (i.e., each is at 50%) there is no net current flow (or torque) applied to motor 18.

In the lower most waveforms, slewed PWM phase control signal 248a is greater than reference voltage 250 and slewed PWM phase control signal 248b is equally less than reference voltage 250. The result is that slewed PWM phase driving signal 256a has a lower duty cycle than does slewed PWM phase driving signal 256b. The difference between signals 256a and 256b results in a net current 258 flowing through the associated phase coils in motor 18. Thus, the torque of motor 18 will be proportional to net current 258.

When this phase-shifted PWM mode of operation is applied to all three phases in a 3 phase system, zero net current will never be reached because each phase essentially steps in during the transition period before this occurs. As a result it is possible, to generate a trapezoidal transition from the minimum duty cycle (e.g., when fully-ON in the phase) by slewing to the opposite condition during the transition period. As shown in FIG. 8a, the slewing period may be established via the selection of the slewing capacitors and current sources. By changing the current (e.g., with the capacitors) the rate of change from one condition to the other is changed. Thus, the trapezoidal shape can be selected with different slopes.

Figure 1:
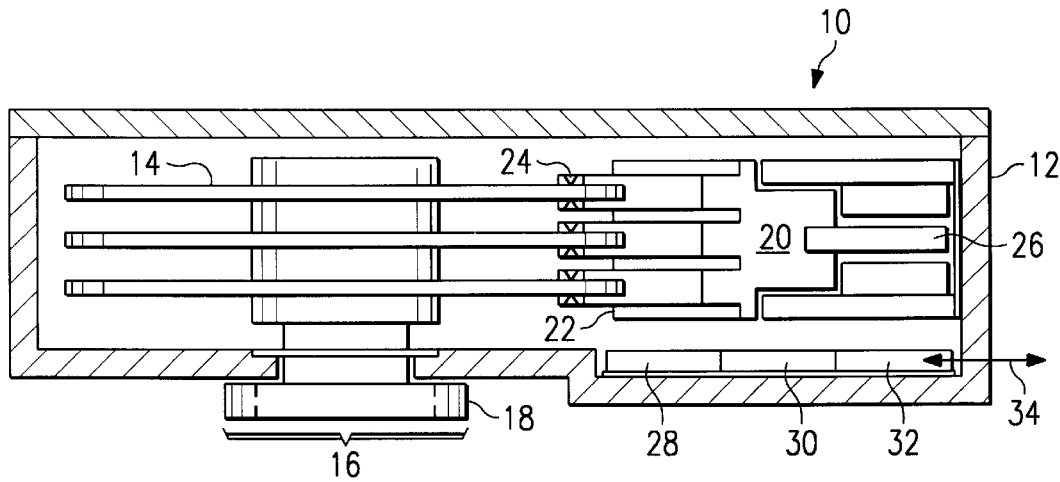
FIG. 1 is a diagrammatic illustration of a conventional disc drive.
Figure 2:
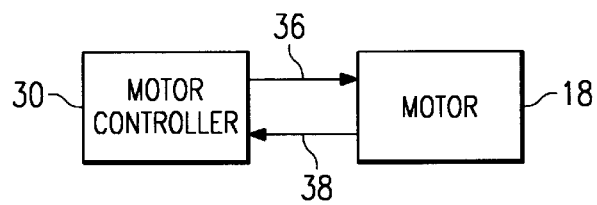
FIG. 2 is a block diagram that illustrates a typical motor controller and motor, for use in the disc drive in FIG. 1.
Figure 3:
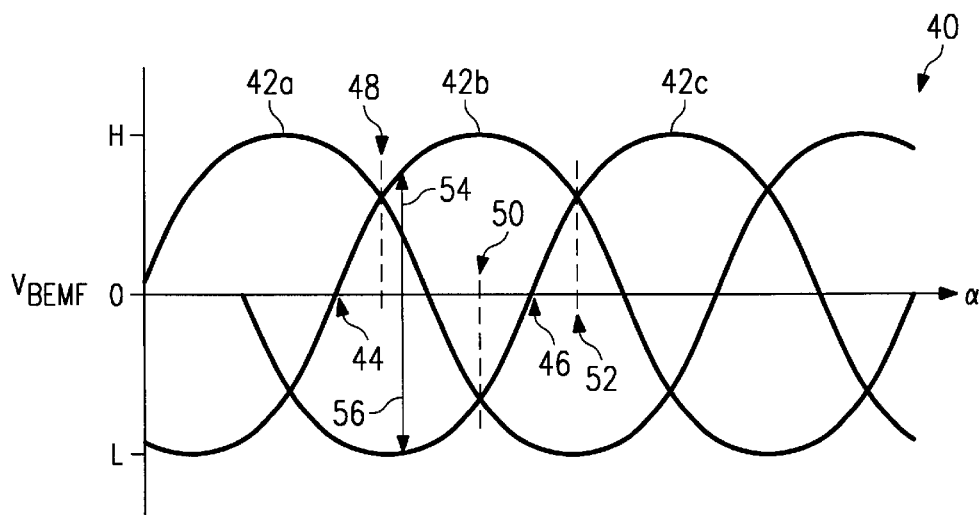
FIG. 3 is a timeline graph that illustrates the basic shape of a back-EMF signal as generated by a motor as in FIG. 2.

Furthermore, the slope of the slewing may be adjusted in accordance with the zero crossing point of the BEMF. For example, to have exactly a 60° trapezoid (i.e., 60° of rise, 120° of flat and 60° of fall) the slope would start 30° (electrical) before the zero crossing as shown in FIG. 3. However, since, it is beneficial to have equal currents in the high and low phases when the two phase's BEMF signals are equal, the rate of slewing will likely determine how far in advance to start commutating. These control strategies would typically be determined by the type system, the motor, and the BEMF of the motor. Additionally, the efficiency of the system may be considered, e.g., the longer the slewing the less efficient the system will tend to be. With the present invention establishing and controlling the slew rate is made easy, because it is matter of simply adjusting the current on the slewing node of each driven phase. It is also recognized that the commutation timing may be optimized for the slew rate.

Of additional benefit in a phase shifted PWM system (as in FIG. 8a) is that it is not possible to drive a phase past zero or to drive out of phase, as in the system in FIG. 7a. For instance, during the transition only the duty cycle is slewed from maximum positive to maximum negative as a result of the clamping diodes which essentially act as rails that shift symmetrically around the reference voltage as a function of the demand for current in accord with the speed control signals. As such, the system controls the total current through the motor by actually fluctuating between the two rails which determine the actual duty cycle. Notice also that the motor driver in FIG. 8a does not require different slew rates (e.g., charge and discharge rates) for each type of transition, because the slew rates are inherently symmetrical, although other optimization strategies may be adapted.

In the driver circuits in FIGS. 6, 7a and 8a, the shape of the resulting PWM driving signal will include additional PWM pulses during the transitioning period that provide for a trapezoidal shaping of the current supplied to each of the phase coils in the motor. The result is that torque ripple is reduced because the overall current applied to the motor and the torque resulting therefrom will tend to be more constant during commutation. Thus, with the present invention the complicated circuitry typically required to generate a sinusoidal drive may be replaced by a much simpler circuit, e.g., by using only a few diodes, capacitors, and current sources. Moreover, the resulting systems function almost as well, indeed, results tend to show little noticeable difference between the sinusoidal and trapezoidal currents.

What is claimed is:

1. A method for driving a multiple-phase motor, the method comprising:

generating a pair of slewed phase control signals that are opposite in polarity, the slewed phase control signals representing at least two operating states, wherein a first one of the operating states is directly proportional to a speed control signal, wherein the phase control signals switch between the operating states in response to a commutation event, the commutation event having a transitioning period associated therewith, wherein the phase control signals are slewed between the operating states during the transition period;

generating a pulse width modulated (PWM) phase driving signal for each of the slewed phase control signals; and supplying the PWM phase driving signals to the motor.

2. The method as recited in claim 1 wherein the transitioning period begins prior to the commutation event and ends after the commutation event.

3. The method as recited in claim 2 wherein the transitioning period begins no sooner than about 30 electrical degrees prior to the commutation event, and ends no later than about 30 electrical degrees after the commutation event.

4. The method as recited in claim 1 wherein the transitioning period begins with the commutation event and ends after the commutation event.

5. The method as recited in claim 4 wherein the transitioning period ends no later than about 30 electrical degrees after the commutation event.

6. The method as recited in claim 1 wherein the transitioning period begins prior to the commutation event and ends with the commutation event.

7. The method as recited in claim 6 wherein the transitioning period begins no sooner than about 60° prior to the commutation event.

8. The method as recited in claim 1 wherein the slewed phase control signals are substantially trapezoidal in shape.

9. The method as recited in claim 1 wherein the PWM phase driving signals are substantially trapezoidal in shape.

10. An apparatus for driving a multiple-phase motor, the apparatus comprising:

a slewing transitioner that generates a pair of pulse width modulated (PWM) phase driving signals, each PWM phase driving signal representing at least two operating states, wherein a first one of the operating states is directly proportional to a speed control signal, wherein the slewing transitioner gradually switches between the operating states during a transitioning period, and supplies the pair of PWM phase driving signals to the motor.

11. The apparatus as recited in claim 10 wherein the transitioning period begins prior to a commutation event and ends after the commutation event.

12. The apparatus as recited in claim 10 wherein the transitioning period begins with a commutation event and ends after the commutation event.

13. The apparatus as recited in claim 10 wherein the transitioning period begins prior to a commutation event and ends with the commutation event.

14. A driver circuit for use in a motor controller having a control circuit that outputs a speed control signal and a commutation control signal the driver circuit comprising:

a buffer stage coupled to the control circuit for receiving the speed control signal, the buffer stage generating at least one phase control signal that is proportional the received speed control signal;

a current switcher stage coupled to the buffer stage for receiving the phase control signal(s), and to the control circuit for receiving the commutation control signal, the current switcher stage generating a slewed phase control signal that is a function of the received phase control signal(s) and the received commutation control signal, wherein the current switcher stage comprises:

(a) a first current source coupled to the control circuit for receiving a first commutation control signal, the first current source generating a first current signal that is a function of the first commutation control signal, the first current signal being supplied to a compensation node within the current switcher stage;

(b) a second current source coupled to the control circuit for receiving a second commutation control signal, the second current source generating a second current signal that is a function of the second commutation control signal, the second current signal being supplied to the compensation node, wherein the second current is opposite in polarity to the first current with respect to the compensation node; and (c) a slewing capacitor coupled to the compensation node and to a ground node;

a comparator stage coupled to the current switcher stage for receiving the slewed phase control signal, the comparator stage generating a pulse width modulated (PWM) phase control signal that is proportional to the slewed phase control signal; and a driving stage coupled to the comparator stage for receiving the PWM phase control signal, the driving stage generating a driving signal that is proportional to the PWM phase control signal that is suitable for driving a motor.

15. The driver circuit as recited in claim 14, wherein the slewed phase control signal represents at least two operating states, wherein a first one of the operating states is directly proportional to a speed control signal, and is switched between the operating states in response to a commutation event, the commutation event having a transitioning period associated therewith wherein the phase control signal is slewed between the operating states during the transition period.

16. The driver circuit as recited in claim 14, wherein the comparator stage comprises a triangular waveform generator and a comparator, wherein the comparator is coupled to the triangular waveform generator for receiving a triangular waveform signal therefrom, and to the current switcher stage for receiving the slewed phase control signal, the comparator outputting the PWM phase control signal as a function of the triangular waveform signal and the slewed phase control signal.

17. The driver circuit as recited in claim 14, wherein the buffer stage comprises a decoupling device having an input node and an output node, wherein the input node is coupled to the control circuit for receiving the speed control signal, the output node is coupled to a compensation node in the current switcher stage for providing the phase control signal thereon, and the decoupling device provides a high impedance on the compensation node.

18. The driver circuit as recited in claim 17, wherein the decoupling device is a transistor having a control terminal as the input node and a second terminal as the output node.

19. A driver circuit for use in a motor controller having a control circuit that outputs a speed control signal and a commutation control signal, the driver circuit comprising:
- a buffer stage coupled to the control circuit for receiving the speed control signal, the buffer stage generating at least one phase control signal that is proportional to the received speed control signal and including:
  (a) a first buffer coupled to the control circuit for receiving the speed control signal, the first buffer generating a first phase control signal, the first phase control signal being proportional to the speed control signal and
  (b) a second buffer coupled the first buffer for receiving the first phase control signal, the second buffer generating a second phase control signal, the second phase control signal being proportional to the speed control signal inversely proportional to the first phase control signal with respect to a reference voltage signal;
- a current switcher stage coupled to the buffer stage for receiving the phase control signal(s), and to the control circuit for receiving the commutation control signal, the current switcher stage generating a slewed phase control signal that is a function of the received phase control signal(s) and the received commutation control signal;
- a comparator stage coupled to the current switcher stage for receiving the slewed phase control signal, the comparator stage generating a pulse width modulated (PWM) phase control signal that is proportional to the slewed phase control signal; and
- a driving stage coupled to the comparator stage for receiving the PWM phase control signal, the driving stage generating a driving signal that is proportional to the PWM phase control signal that is suitable for driving a motor.

20. The driver circuit as recited in claim 19, wherein the second buffer is an inverting buffer having a first input coupled to the reference voltage signal and a second input coupled to receive the first phase control signal from the first buffer.

21. The driver circuit as recited in claim 19, wherein the slewed current switcher stage comprises a clamping diode coupled between the buffer stage and the compensation node.

22. A motor controller for use with a motor, the motor controller comprising:
- a control circuit arranged to generate a speed control signal and a commutation control signal; and
- a driver circuit comprising:
  a buffer stage coupled to the control circuit for receiving the speed control signal, the buffer stage generating at least one phase control signal that is proportional the received speed control signal;
  a current switcher stage coupled to the buffer stage for receiving the phase control signal(s), and to the control circuit for receiving the commutation control signal, the current switcher stage generating a slewed phase control signal that is a function of the received phase control signal(s) and the received commutation control signal, wherein the current switcher stage comprises:
    (a) a first current source coupled to the control circuit for receiving a first commutation control signal, the first current source generating a first current signal that is a function of the first commutation control signal, the first current signal being supplied to a compensation node within the current switcher stage;
    (b) a second current source coupled to the control circuit for receiving a second commutation control signal, the second current source generating a second current signal that is a function of the second commutation control signal, the second current signal being supplied to the compensation node, wherein the second current is opposite in polarity to the first current with respect to the compensation node; and
    (c) a slewing capacitor coupled to the compensation node and to a ground node;
  a comparator stage coupled to the current switcher stage for receiving the slewed phase control signal, the comparator stage generating a pulse width modulated (PWM) phase control signal that is proportional to the slewed phase control signal; and
  a driving stage coupled to the comparator stage for receiving the PWM phase control signal, the driving stage generating a driving signal that is proportional to the PWM phase control signal that is suitable for driving a motor.

23. A disc drive comprising:
a motor; and
a motor controller comprising:
  a control circuit arranged to generate a speed control signal and a commutation control signal; and
  a driver circuit comprising:
    a buffer stage coupled to the control circuit for receiving the speed control signal, the buffer stage generating at least one phase control signal that is proportional the received speed control signal;
    a current switcher stage coupled to the buffer stage for receiving the phase control signal(s), and to the control circuit for receiving the commutation control signal, the current switcher stage generating a slewed phase control signal that is a function of the received phase control signal(s) and the received commutation control signal, wherein the current switcher stage comprises:
      (a) a first current source coupled to the control circuit for receiving a first commutation control signal, the first current source generating a first current signal that is a function of the first commutation control signal, the first current signal being supplied to a compensation node within the current switcher stage;
      (b) a second current source coupled to the control circuit for receiving a second commutation control signal, the second current source generating a second current signal that is a function of the second commutation control signal, the second current signal being supplied to the compensation node, wherein the second current is opposite in polarity to the first current with respect to the compensation node; and (c) a slewing capacitor coupled to the compensation node and to a ground node;

a comparator stage coupled to the current switcher stage for receiving the slewed phase control signal, the comparator stage generating a pulse width modulated (PWM) phase control signal that is proportional to the slewed phase control signal; and a driving stage coupled to the comparator stage for receiving the PWM phase control signal, the driving stage generating a driving signal that is proportional to the PWM phase control signal that is suitable for driving the motor.

* * * * *